United States Patent
Chen (10) Patent No.: US 6,834,293 B2
(45) Date of Patent: Dec. 21, 2004

(54) VECTOR SCALING SYSTEM FOR G.728 ANNEX G

(75) Inventor: Shiuh-Yuan Chen, Los Altos, CA (US)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 09/882,766

(22) Filed: Jun. 15, 2001

(65) Prior Publication Data

US 2003/0005015 A1 Jan. 2, 2003

(51) Int. Cl.[7] .............................. G06F 7/32; G06F 7/00
(52) U.S. Cl. ...................................... 708/520; 708/208
(58) Field of Search ................................ 708/520, 208

(56) References Cited

U.S. PATENT DOCUMENTS 6,075,906 A * 6/2000 Fenwick et al. ............ 382/298
6,424,940 B1 * 7/2002 Agassy et al. .............. 704/219

* cited by examiner

*Primary Examiner*—Tan V. Mai
(74) *Attorney, Agent, or Firm*—Townsend and Townsend and Crew LLP (57) ABSTRACT

A method, by a processing device, for scaling an M-bit integer input vector containing one or more vector elements. The method comprises receiving a maximum permitted left shift (MLS) value for the input vector, said MLS value being less than or equal to $M-2$; determining a minimum left shift (NLS_MIN) for scaling said vector element with the largest magnitude; employing said NLS_MIN value to determine whether said input vector is a zero input vector, or a non-zero input vector irrespective of the positive or negative value of the largest element values of said non-zero input vector; if a non-zero input vector is determined, offsetting said NLS_MIN value by said MLS value to obtain an actual number of left shifts (NLS) value for scaling said input vector; and if a zero input vector is determined, offsetting said NLS_MIN value by said MLS value to obtain the NLS value.

10 Claims, 3 Drawing Sheets

VECTOR SCALING SYSTEM FOR G.728 ANNEX G

BACKGROUND OF THE INVENTION

The present invention relates generally to the field of information processing and more specifically to a vector scaling system for block floating point representation.

Conventional algorithms for vector scaling are well known. One such algorithm is the VSCALE routine defined by ITU (International Telecommunication Union)-T Recommendation G.728—Annex G. The recommendation relates to 16 kbit/s LD-CELP (code excited linear prediction) using a block floating point representation device. While directed to a 16-bit word size, it will be appreciated that VSCALE is applicable to other word sizes as well.

The importance of vector scaling for floating block representation cannot be over-emphasized. Vector scaling ensures the maximization of precision in fixed point DSP (digital signal processing) algorithms. Moreover, to obtain accuracy and consistency in fixed point fractional implementation, the vector values require left justification.

Generally, floating block representation is used for accommodating a more dynamic range of values (the ratio of the largest number represented to the smallest represented number that is non-zero for a given format). A floating point representation of a value comprises three portions, namely, a sign bit, an unsigned fractional number, and an exponent.

Figure 1:
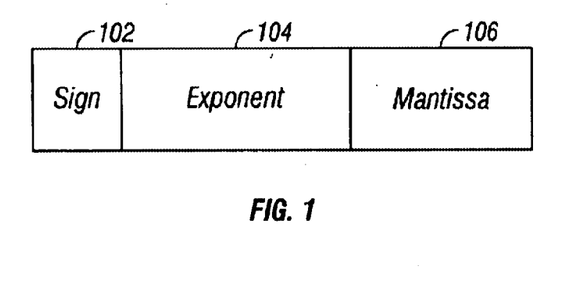
FIG. 1 is a single precision, IEEE standard 754, single point precision floating point representation.

As shown, FIG. 1 is a single precision, IEEE standard 754, single point precision floating point representation. In FIG. 1, the representation comprises a sign 102 bit for representing the sign of the entire number, an exponent 104 which is an 8-bit value representing the true exponent of the number V (see below) and offset by a predetermined bias, the bias being employed for comparing both positive and negative true exponents of floating point numbers; and a mantissa 106 which is a 23-bit number having a leading 1 bit (typically implied):

$$V=(-1)^S \cdot 2^{E-bias}(1 \cdot F)$$

where S is the sign 102 bit,

E is the exponent 104, and

F is the mantissa 106.

This format can accommodate numbers having exponents from −127 to +128 in accordance with the IEEE standard 754. Various conventional techniques for scaling a vector are known.

One such scheme is the VSCALE originally proposed in G.728 Annex G. VSCALE is a pseudo-code for performing vector scaling for block floating point representation. Its purpose is to scale a vector of numbers so that the largest magnitude of its elements is left justified as desired. As discussed below, VSCALE initially conducts a maximum positive and negative value search of the vector elements. Thereafter, the result is classified into one of five cases. For each case, scaling is accomplished by looping and counting the number of shifts before a designated maximum or positive range. Disadvantageously, the VSCALE process results in relatively more complex code and relatively more time to accomplish scaling. For example, if a user wishes to scale a large vector, disadvantageously, additional time is needed by VSCALE to accomplish its objective.

Therefore, there is a need to resolve the aforementioned problems relating to the conventional approach for scaling vectors for floating point representation and the present invention and its embodiments meet this need.

BRIEF SUMMARY OF THE INVENTION

A first embodiment of the present invention is a system that reduces the complexity of the VSCALE routine in G.728 Annex G. This technique simplifies the maximum positive and negative value search in the vector and the calculation of the number of bit shifts needed for normalizing the vector by employing a pdmsb instruction. The pdmsb instruction is part of the SHx-DSP™ DSP instruction set, available from Hitachi, Inc., of Japan. The pdmsb instruction functions to find the number of bits to left-shift in order to left-justify a value.

According to another aspect of the present invention, a method for use in a fixed point arithmetic processing device having an input vector that contains one or more vector elements is disclosed. The input vector is an M bit integer, and a maximum permitted left shift (MLS) value for the input vector is less than or equal to the value of M−2. The method is for scaling all the vector elements based on the vector element with the largest magnitude. The method includes the following: sequentially searching each vector element to find a left shift value for scaling each vector element, and comparing the left shift values to determine a minimum left shift (NLS_MIN) for scaling the largest vector element.

Also, the method employs the NLS_MIN value to determine whether the input vector is a zero input vector, and if so, offsetting the NLS_MIN value by the MLS value to obtain an actual number of left shifts (NLS) value, for which the input vector would have been shifted but for the zero value. It is determined whether the input vector is a non-zero input vector, and if so, regardless of whether the largest magnitude element of the non-zero input vector has a positive or negative magnitude, offsetting the NLS_MIN value by the MLS value to obtain the NLS value for scaling the non-zero input vector.

According to another aspect of the present invention, the method further includes completing in one clock instruction the steps of sequentially searching, and comparing the left shift values with the pdmsb instruction. The pdmsb instruction finds the number of left shifts necessary to left justify a 2's complement 32-bit value in one instruction cycle.

According to another aspect of the present invention, a method, by a processing device, for scaling an M-bit integer input vector containing one or more vector elements. The method comprises receiving a maximum permitted shift (MLS) value for the input vector, said MLS value being less than or equal to M−2; determining a minimum left shift (NLS_MIN) for scaling said vector element with the largest magnitude; employing said NLS_MIN value to determine whether said input vector is a zero input vector, or a non-zero input vector irrespective of the positive or negative value of said largest element of non-zero input vector; if a zero input vector is determined, offsetting said NLS_MIN value by said MLS value to obtain an actual number of left shifts (NLS) value; determining whether said input vector is non-zero input vector, and if a non-zero input vector is determined, offsetting said NLS_MIN value by said MLS value to obtain said NLS value for scaling said non-zero input vector.

According to another aspect of the present invention, the step of offsetting said NLS_MIN value for said zero input vector further comprises said NLS value being given by: MLS+1.

According to another aspect of the present invention, offsetting said NLS_MIN value for said non-zero input vector further comprises said NLS value being given by: NLS_MIN+(MLS−(M−2)).

According to another aspect of the present invention, the method further comprises employing the pdmsb instruction for sequentially searching, and for comparing said left shift values.

According to another aspect of the present invention, employing said MLS_INPUT value further comprises determining whether NLS_MIN=31, if NLS_MIN≠31, then the input vector is a non-zero input vector.

According to another aspect of the present invention, a processor operable from an M-bit instruction set where M is an integer. The processor includes a memory unit for storing at least first instruction stream comprising M-bit instructions; an execution unit operable to receive execution signals to execute the M-bit instructions; a decode unit coupled to the memory unit and to the execution unit to receive and decode the first instruction stream from the memory unit to produce therefrom the execution signals.

The execution signals for: determining a minimum left shift (NLS_MIN) for scaling said vector element with the largest magnitude; employing said NLS_MIN value to determine whether said input vector is a zero input vector, or a non-zero input vector by evaluating if NLS_MIN=31; if NLS_MIN≠31, then the input vector is a non-zero input vector; and determining an actual number of left shifts (NLS) for scaling the non-zero input vector.

According to another aspect of the present invention, the execution signals are for receiving a maximum permitted shift (MLS) value for said input vector, said MLS value being less than or equal to M−2.

According to another aspect of the present invention, determining an actual number of left shifts (NLS) further comprises offsetting said NLS_MIN with the MLS value to obtain said NLS value.

Advantageously, unlike conventional vector scaling schemes that search for the maximum positive and negative values, the present invention searches for the minimum number of left shift value (NLS_MIN) returned by the pdmsb instruction. Moreover, where the vector size is much larger, the instruction saving in the search routine are be more significant. Three steps are needed to search each vector element, whereas relatively more steps are required for the conventional method, resulting in a 25% cycle saving.

A further understanding of the nature and advantages of the present invention herein may be realized by reference to the remaining portions of the specification and the attached drawings. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements. Reference numbers differing by multiples of 100 indicate identical or functionally similar elements except as modified to accommodate the present invention.

DETAILED DESCRIPTION OF THE INVENTION

A first exemplary embodiment of the present invention is a system for simplifying the VSCALE routine in G.728 Annex G. Simplification is accomplished by using the pdmsb instruction available in the Hitachi, Inc., SHx-DSP™ DSP instruction set. The pdmsb instruction finds the number of bits to left-shift in order to left-justify a value. For example, assuming a 16-bit input vector with the following vector elements value, 0,2,4, 8 16, requires scaling such that the maximum number 16 is left justified. The equivalent values in binary are 0, 10, 100, 1000, 10000, respectively.

To left justify 16, the most significant bit 1 of 10000 is shifted nine bits to the left from the 5th position to the 15th bit position. Moreover, the entire vector is scaled by the same amount. By employing the pdmsb instruction, a need to manually search for the most positive and negative values in the vector is no longer required, thus reducing the steps employed by conventional techniques for normalizing a vector.

Figure 2A:
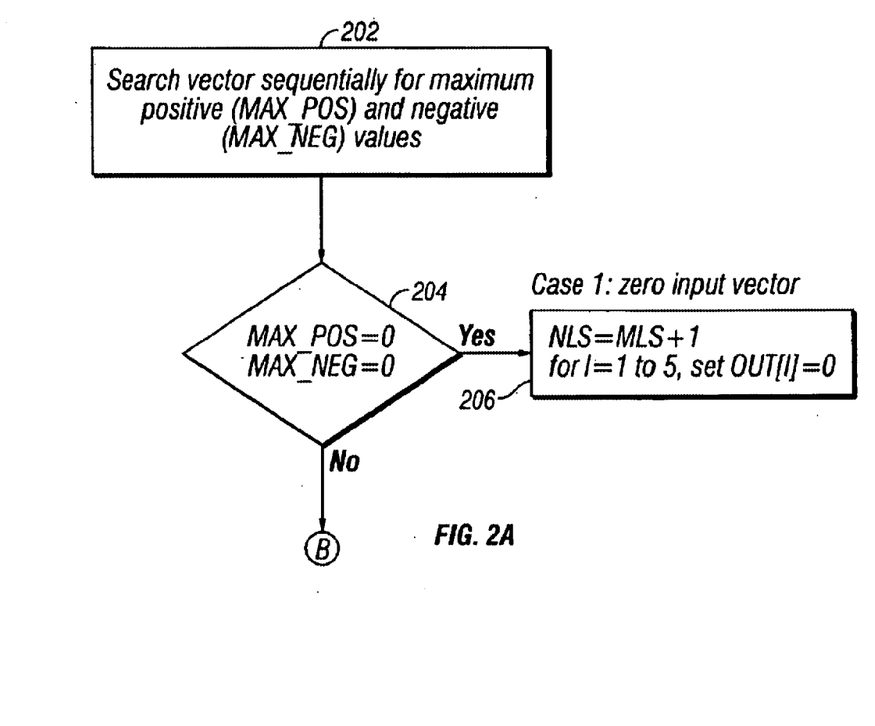
FIGS. 2A-2B show a flow chart for scaling a vector in accordance with conventional scaling techniques.
Figure 2B:
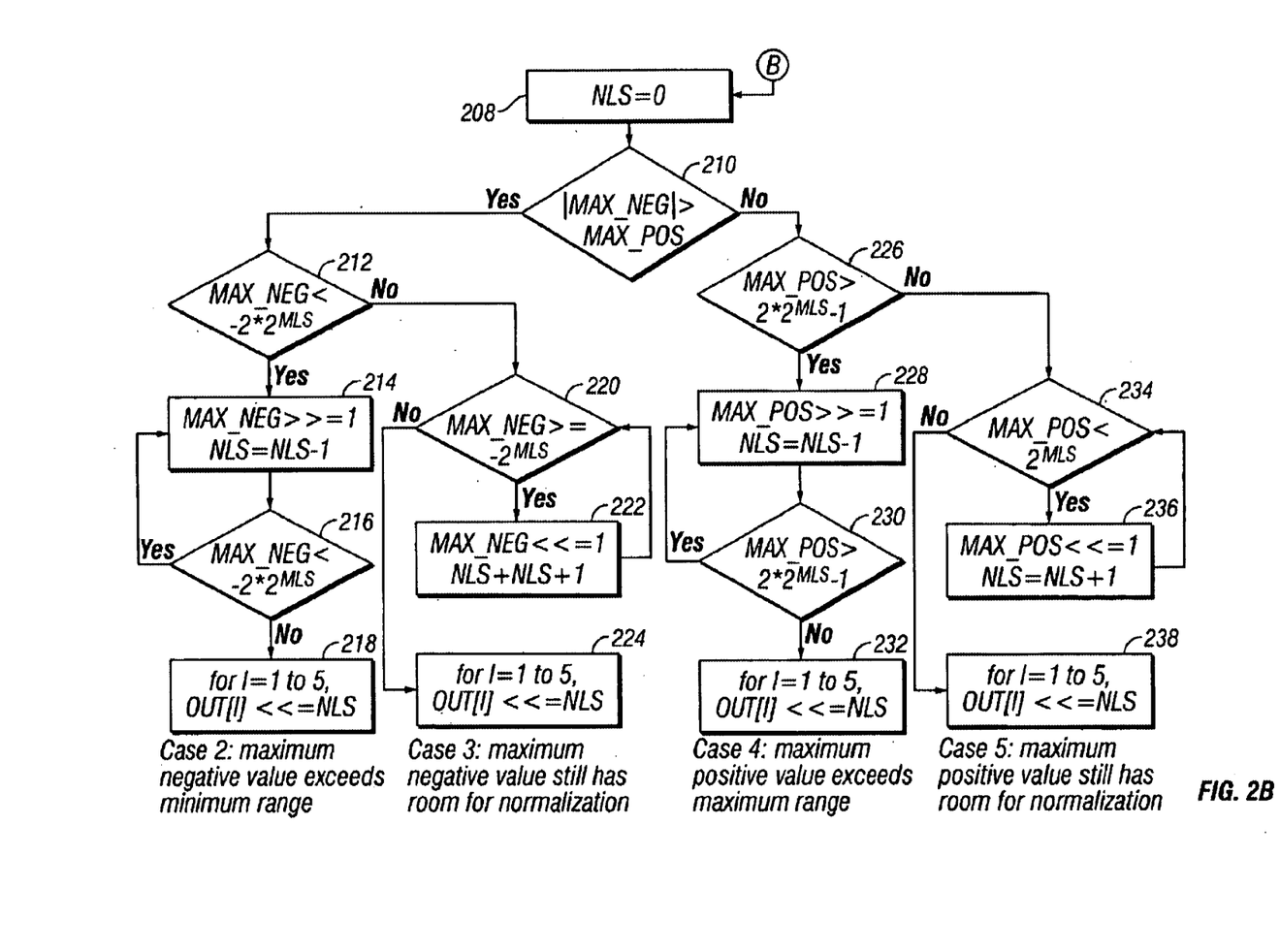

FIG. 2 is a flow chart for scaling a vector in accordance with conventional scaling techniques.

In FIG. 2 specifically, the steps employed by the VSCALE routine for vector scaling are shown. The input parameters to this routine are the input vector to be scaled (IN), the length of the input vector (LEN), the search length for finding the maximum value (SLEN), and the maximum number of left shifts permitted (MLS). The output parameters are the scaled output vector (OUT) and the number of left shifts used (NLS).

It should be observed that SLEN specifies the number of elements to search, and for most cases, SLEN is set to LEN. If it is known that the largest magnitude element is located within the first X elements (X<LEN) of the vector, then specifying SLEN=X reduces the search time.

In a first implementation, the routine is simplified as follows: (1) LEN=5, since VSCALE always operates on a frame vector of 5 samples; (2) SLEN=5, since the location of the maximum value is always unknown. In addition, VSCALE searches all of the five vector elements.

At block 202, the input vector is sequentially searched for the maximum positive (MAX_POS) and maximum negative (MAX_NEG) values. Depending on the magnitude of the maximum positive and negative values and MLS value, the number of normalization shifts is calculated by looping and counting (performed in blocks below) the number of shifts before the designated maximum or minimum range is exceeded. As discussed below, there are five cases depending on the magnitude of the input vector.

At decision block 204, it is determined whether MAX_POS=0 and MAX_NEG=0.

At block 206, MAX_POS=0 and MAX_NEG=0. This is the first of five cases referred to as case 1. For this case, MLS is incremented by one to obtain the NLS value, which is used to scale the entire vector, as below.

$NLS=MLS+1$ for I=1 to 5, OUT[I]=0 where I is element number in the vector; and
OUT[I]=the output element being set to zero.

At block 208, NLS is equated to zero, since MAX_POS and/or MAX_NEG has a value other than zero. That is, NLS=0 is just to reset the counter to 0 before the number of shifts is counted.

At decision block 210, it is determined whether the absolute maximum negative value is larger than the maximum positive value. If so, the method proceeds to decision block 212, as shown.

At decision block 212, the routine involves determining whether $MAX\_NEG < -2 * 2^{MLS}$. If yes, the routine proceeds to block 214. Otherwise, it progresses to decision block 220 as shown.

At block 214, the steps for case 2 are shown. An iteration process begins such that while $MAX\_NEG < -2 * 2^{MLS}$, the iteration process is continued. For each loop, the MAX_NEG value is right shifted by 1 bit. The MAX_NEG value right shifted by 1 bit is equated to a new MAX_NEG value. Thereafter, the NLS value is decremented by one (for right shifting). The NLS value is basically a counter for counting the number of shifts until the maximum range is reached.

At decision block 216, the condition MAX_NEG<.-$2*2^{MLS}$ is checked again. If no, the loop is returned to block 214, until the condition is met, wherein the loop is forwarded to block 218.

At block 218, the entire input vector is scaled by the actual NLS value. The routine illustrating case 2 is as follows:

while (MAX_NEG<-$2*2^{MLS\ S}$)
{MAX_NEG=MAX_NEG>>1
NLS=NLS-1}
for I=1 to 5, OUT[I]=IN[I]<<NLS Decision block 220 through blocks 222, 224 illustrate case 3 wherein the maximum negative value has room for normalization. It should be observed that at block 222, a left shift as opposed to a right shift occurs wherein the MAX_NEG value is left shifted by one bit and equated to a new MAX_NEG value. The following conditional routine illustrates case 3:

while (MAX_NEG>=-$2^{MLS}$)
{MAX_NEG=MAX_NEG<<1
NLS=NLS+1}
for I=1 to 5, OUT[I]=IN[I]<<NLS At decision block 226, the routine involves determining whether MAX_POS>$2*2^{MLS}$-1. If yes, the routine progresses to block 228. Otherwise, it progresses to decision block 234 as shown.

At block 234, the steps for case 5 are shown. An iteration process begins such that while MAX_POS<$2^{MLS}$, the iteration process is continued.

At block 236, for each loop, the MAX_POS value is left shifted by 1 bit. The MAX_POS value left shifted by one bit is equated to a new MAX_POS value. Thereafter, the NLS value is incremented by one (for left shifting). The routine proceeds back to block 234 to check the condition MAX_POS<$2^{MLS}$. For example, if MAX_POS is 16 ($2^4$) and MLS is 14, then $2^4<2^{14}$. For a first bit shift to the left, MAX_POS becomes $2^5$ and the NLS counter is incremented, until the condition MAX_POS<$2^{MLS}$ no longer holds true.

At block 238, the entire input vector is scaled by the actual NLS value. The routine illustrating case 5 (if maximum positive value still has room for normalization) is as follows:

while (MAX_POS<$2^{MLS}$)
{MAX_POS=MAX_POS<<1
NLS=NLS+1}
for I=1 to 5, OUT[I]=IN[I]<<NLS Blocks 228, 230 and 232 illustrate case 4 wherein the maximum positive value exceeds the maximum range. As shown, the following conditional routine is illustrated. It should be observed that at block 228, the MAX_POS value is right-shifted by one bit and equated to a new MAX_POS value.

while (MAX_POS>$2*2^{MLS}$-1)
{MAX_POS=MAX_POS>>1
NLS=NLS-1}
for I=1 to 5, OUT[I]=IN[I]<<NLS Other than for case 1, the input vector elements are bit-shifted according to the computed NLS value and stored into the output vector.

Figure 3:
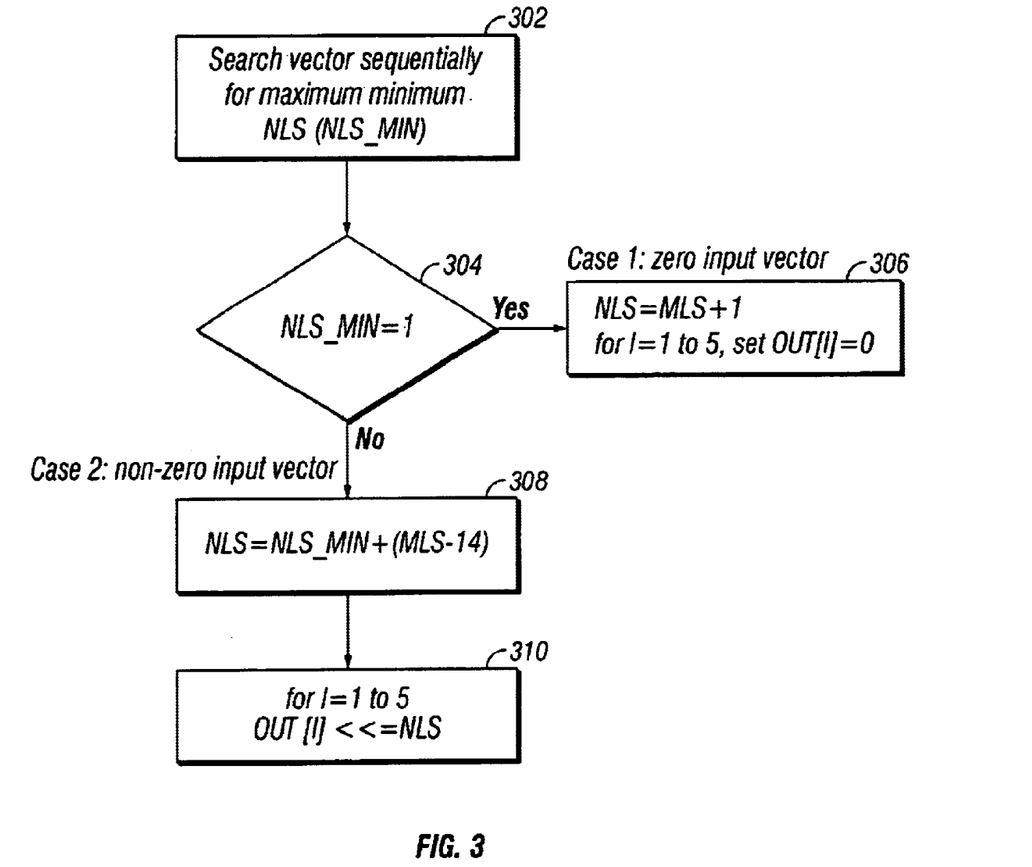
FIG. 3 is a flow chart of a method for scaling an input vector in accordance with an exemplary embodiment of the present invention.

FIG. 3 is a flow chart of a method for scaling an input vector in accordance with an exemplary embodiment of the present invention.

The input vector contains one or more vector elements wherein all of the vector elements are scaled based on the vector element with the largest magnitude. Further, the input vector is a 16 bit integer (single precision block floating point), although one of ordinary skill in the art will realize that M-bit vectors may be scaled according to the present invention, where M is an integer. For example, the present embodiment is operable with a 32-bit integer vector (double precision block floating point).

In FIG. 3, the method employs the SHx-DSP™ pdmsb instruction, a product of Hitachi Inc., of Japan. The pdmsb instruction finds the number of left shifts necessary to left justify a 2's complement 32-bit value in one instruction cycle. It should be observed that the pdmsb instruction operates on a 32 bit integer basis. The table below illustrates the functionality of the pdmsb instruction.

TABLE 1

| Format | Abstract | Code | Cycle | DC Bit |
|---|---|---|---|---|
| PDMSB Sx, Dz | Sx data MSB position → MSW of Dz, clear LSW of Dz | 111110********** 10011101xx00zzzz | 1 | Update |
| PDMSB Sy, Dz | Sy data MSB position → MSW of Dz, clear LSW of Dz | 111110********** 1011110100yyzzzz | 1 | Update |
| DCT PDMSB Sx, Dz | If DC = 1, Sx data MSB position → MSW of Dz, clear LSW of DZ; if 0 nop | 111110********** 10011110xx00zzzz | 1 | — |
| DCT PDMSB Sy, Dz | If DC = 1, Sy data MSB position → MSW of Dz, clear LSW of Dz; if 0, nop | 111110********** 101111100yyzzzz | 1 | — |
| DCF PDMSB Sx, Dz | If DC = 0, Sx data MSB position → MSW of Dz, clear LSW of Dz; if 1, nop | 111110********** 10011111xx00zzzz | 1 | — |
| DCF PDMSB Sy, Dz | If DC = 0, Sy data MSB position → MSW of Dz, clear LSW of Dz; if 1, nop | 111110********** 1011111100yyzzzz | 1 | — |

The pdmsb instruction finds the first position to change in the lineup of Sx and Sy operand bits and stores the bit position in the Dz operand. In other words, the pdmsb instruction finds the number of bits to shift the MSB bit to bit 30 (the bit before sign bit). e.g. for 00 . . . 010000 (16), pdmsb returns 26, which is stored in the higher 16-bit (MSW) of the 32-bit Dz register. The lower 16-bit of Dz is simply cleared.

When conditions are specified for DCT and DCF, the instruction is executed when those conditions are TRUE. When they are FALSE, the instruction is not executed. When conditions are not specified, the DC bit of the DSR register is updated according to the specifications for the CS bits. The N, Z, V, and GT bits of the DSR register are also updated. The DC, N, Z, V, and GT bits are not updated when conditions are specified, even if the conditions are TRUE.

The present invention is implementable on computer systems comparable to the SHx series DSPs, a new generation of RISC microcomputers, from Hitachi, Inc. that integrates a RISC-type CPU and the peripheral functions required for system configuration onto a single chip. Basic instructions can be executed in one clock cycle, improving instruction execution speed. In addition, the CPU has a 32-bit internal architecture for enhanced data-processing ability.

In FIG. 3, at block 302, using the pdmsb instruction, a minimum left shift (NLS_MIN) for scaling the vector element with the largest magnitude is determined.

Although not shown, this step comprises the sub-steps of sequentially searching each vector element to find a left shift value for scaling each vector element, and comparing the left shift values to determine the NLS_MIN value for scaling the largest vector element. Herein lies one advantage of the present invention. Unlike conventional vector scaling schemes that search for the maximum positive and negative values, the present invention mere merely searches for the minimum number of left shift value (NLS_MIN) returned by the pdmsb instruction. The element with the smallest NLS represents the maximum positive or negative value in the vector. As discussed below, this search technique eliminates the need of having to later differentiate the 4 non-zero input vector cases described in the original algorithm since the maximum value is already uniquely identified as the one with minimum NLS (NLS_MIN) regardless of its polarity. Moreover, having found NLS_MIN, the task of computing NLS by the looping and shifting method implemented in the related is no longer required.

At decision block 304, after the NLS_MIN value is obtained, it is employed to determine whether the input vector is a zero input vector. When all vector elements are zero, the search will return NLS_MIN=31 assuming the vector elements are single precision (16-bit values). It should be observed that NLS_MIN<=14 if at least one element is non-zero. Hence, this condition is used as a legitimate check for zero input vector case.

At block 306, if the input vector is zero, the NLS_MIN value is offset by the MLS value to obtain an actual number of left shifts (NLS) value. This is accomplished by simply setting to MLS+1 and output vector set to zero. While the input zero vector is not scaled, the NLS value is returned.

At block 308, if the input vector is a non-zero vector, regardless of whether the largest element of the non-zero input vector has a positive or negative magnitude, the method involves offsetting the NLS_MIN value by the MLS value to obtain the NLS value for scaling the largest element of non-zero input vector. Advantageously, only two cases, for zero and non-zero vectors need be evaluated. This eliminates most of the condition checks and branches. For non-zero input vectors, NLS is obtained from the equation:

$$NLS=NLS\_MIN+(MLS-(M-2))$$

where M is an integer for the bit value of the input vector. For example, for a 16-bit input vector, M−2=14. Advantageously, from the equation above, the computation of NLS involves one subtraction and one addition (2 instructions total) unlike conventional schemes which may incur significantly higher instruction cycles if more shifting is needed for normalization. More specifically, if n bit shifts are needed, then 4n instructions are required to perform the shifts, because each shift requires 4 steps as illustrated the table 2 below:

TABLE 2

| Old NLS computation method | |
|---|---|
| Step 1 | left/right-shift 1 bit |
| Step 2 | increment/decrement NLS |
| Step 3 | check if shifted number is fully normalized |
| Step 4 | branch back to Step 1 if false |

In the more general case where the vector size is much larger, the instruction saving in the search routine are significant. Three steps are needed to search each vector element, whereas additional steps are required for the conventional technique, resulting in a 25% cycle saving. The table below compares the steps of the conventional and the present invention.

TABLE 3

| | New Search | Conventional Search |
|---|---|---|
| Step 1 | Find NLS for element using pdmsb | Check if element is larger than maximum value |
| Step 2 | Check if NLS is less than minimum NLS | Update maximum value if true |
| Step 3 | Update minimum NLS if true | Check if element is less than minimum value |
| Step 4 | | Update minimum value if true |

At block 310, having computed NLS, bit shifting of the input vector is performed, and stored in the output vector.

In this fashion, the present invention provides a system for efficient implementation of the G.728 annex G VSCALE routine. While the above is a complete description of exemplary specific embodiments of the invention, additional embodiments are also possible. Thus, the above description should not be taken as limiting the scope of the invention, which is defined by the appended claims along with their full scope of equivalents.

PATENT

Attorney Docket No.: 16869B-024900US

APPENDIX

The following code listing shows one implementation of the conventional VSCALE routine in accordance with ITU (International Telecommunication Union)-T Recommendation G.728 – Annex G.

```
;search for maximum positive and negative values in vector
                          movs.w   @r4+,y0
        pcopy  y0,y1.     movx.w   @r4+,x1
        pcmp   x1,y0
   dct  pcopy  x1,y0
        pcmp   x1,y1
   dcf  pcopy  x1,y1      movx.w   @r4+,x1
        pcmp   x1,y0
   dct  pcopy  x1,y0
        pcmp   x1,y1
   dcf  pcopy  x1,y1      movx.w   @r4+,x1
        pcmp   x1,y0
   dct  pcopy  x1,y0
        pcmp   x1,y1
   dcf  pcopy  x1,y1      movx.w   @r4,x1
        pcmp   x1,y0      movx.w   @r4+r8,x0
   dct  pcopy  x1,y0      movx.w   @r4+r8,x0
        pcmp   x1,y1      movx.w   @r4+r8,x0
   dcf  pcopy  x1,y1      movx.w   @r4+r8,x0 sts    y0,r1
   mov  r1,r0
        sts    y1,r7
        or     r7,r0
        tst    r0,r0
        bt     VS_ZERO pabs   y1,y1
        pclr   a0
        pinc   a0,a0
        lds    r6,y0
        psha   #16,y0
        psha   a0,y0,a0 sts    y1,r0
        cmp/ge         r0,r1
        bt/s   vs_pos
        mov    #0,r0 sts    a0, r3
        neg    r3,r3
        mov    r3,r2
        snll   r2
        cmp/ge         r2,r7
        bf     vsloop3 cmp/gt         r7,r3
        bt     vs_end2

;Case 3: maximum negative value still has room for normalization
        .align  4
vsloop41:
        shal   r7
        cmp/gt         r7,r3
        bf/s   vsloop41
        add    #1,r0
```

```
        lds     r0,y0
    psha #16,y0
        movs.w  @r4+,x1
        psha    x1,y0,a0      movx.w  @r4+,x1
    psha x1,y0,a1    movx.w  @r4+,x1
                              movs.w  a0,@r5+
                              movx.w  a1,@r5+
        psha    x1,y0,a0      movx.w  @r4+,x1
        psha    x1,y0,a1      movx.w  @r4+,x1
                              movx.w  a0,@r5+
        psha    x1,y0,a0
    movx.w  a1,@r5+
                              movx.w  a0,@r5+ rts
        nop

;Case 2: maximum negative value exceeds minimum range vsloop3:
        cmp/ge      r2,r7
        bt      vs_end2
        .align      4
    vsloop31:
        shar    r7
        cmp/ge      r2,r7
    bf/s    vsloop31
        add     #-1,r0 lds     r0,y0
        psha    #16,y0
        movs.w  @r4+,x1
        psha    x1,y0,a0      movx.w  @r4+,x1
        psha    x1,y0,a1      movx.w  @r4+,x1
                              movs.w  a0,@r5+
                              movx.w  a1,@r5+
        psha    x1,y0,a0      movx.w  @r4+,x1
        psha    x1,y0,a1      movx.w  @r4+,x1
                              movx.w  a0,@r5+
        psha    x1,y0,a0
                              movx.w  a1,@r5+
                              movx.w  a0,@r5+ rts
        nop

;Case 1: zero input vector
    VS_ZER0:
        pclr a0
                              movs.w  a0,@r5+
                              movx.w  a0,@r5+
                              movx.w  a0,@r5+
                              movx.w  a0,@r5+
                              movx.w  a0,@r5+
        mov r6,r0
        add #1,r0 rts
        nop

.align      4
    vs_pos:
```

```
        sts     a0,r2
        mov     r2,r3
    add #-1,r3
        add     r2,r3 cmp/ge      r1,r3
        bf      vsloop5 cmp/ge      r2,r1
        bt      vs_end2

;Case 5: maximum positive value still has room for normalization
        .align    4
    vsloop61:
        shal    r1
        cmp/ge      r2,r1
        bf/s    vsloop61
        add #1,r0
    vs_end2:
        lds     r0,y0
        psha    #16,y0
        movs.w  @r4+,x1
        psha    x1,y0,a0        movx.w  @r4+,x1
        psha    x1,y0,a1        movx.w  @r4+,x1
                                movs.w  a0,@r5+
                                movx.w  a1,@r5+
        psha    x1,y0,a0        movx.w  @r4+,x1
        psha    x1,y0,a1        movx.w  @r4+,x1
                                movx.w  a0,@r5+
        psha    x1,y0,a0
                                movx.w  a1,@r5+
                                movx.w  a0,@r5+ rts
        nop

;Case 4: maximum positive value exceeds maximum range
    vsloop5
        cmp/ge      r1,r3
        bt      vs_end2

.align    4
    vsloop5:
        shar    r1
        cmp/ge      r1,r3
        bf/s    vsloop51
        add     #-1,r0 bra     vs_end2
        nop

The following is an algorithm in accordance with a first embodiment of the
    present invention.

;search for minimum NLS
                                movs.w  @r4+,x0
        pdmsb   x0,a0           movx.w  @r4+,x0
        pdmsb   x0,y0
        pcmp    a0,y0
    dct pcopy   y0,a0           movx.w  @r4+,x0
```

```
        pdmsb   x0,y0
        pcmp    a0,y0
    dct pcopy   y0,a0       movx.w  @r4+,x0
        pdmsb   x0,y0
        pcmp    a0,y0
    dct     pcopy y0,a0     movx.w  @r4,x0
        pdmsb   x0,y0       movx.w  @r4+r8,x1;dummy movx to reset r4=&IN[0]
        pcmp    a0,y0       movx.w  @r4+r8,x1
    dct pcopy   y0,a0       movx.w  @r4+r8,x1
        psha    #-16,a0     movx.w  @r4+r8,x1 sts     a0, r0                  ;r0=NLS_MIN

;Case 1: zero input vector
        cmp/eq          #31, r0
        bf/s    VSCALE1_check_NLSeq31_end
        mov     r6, r7          ;r6=MLS mov     r6, r0
        add     #1, r0          ;set r0=NLS = MLS + 1
        pclr a0
                                movs.w  a0,@r5+
                                movx.w  a0,@r5+
                                movx.w  a0,@r5+
                                movx.w  a0,@r5+
                                movx.w  a0,@r5+
        rts
        nop ;Case 2: non-zero input vector
VSCALE1_check_NLSeq31_end:
        add     #-14, r7        ;r7=MLS-14
        add     r7, r0          ;r0=NLS = NLSmin - (MLS-14)
        lds     r0, y0 psha #16,y0
                                movs.w  @r4+,x0
        psha    x0,y0,a0        movx.w  @r4+,x1
        psha    x1,y0,a1        movx.w  @r4+,x0
                                movs.w  a0,@r5+
        psha    x0,y0,a0        movx.w  a1,@r5+
                                movx.w  a0,@r5+
                                movx.w  @r4+,x1
        psha    x1,y0,a1        movx.w  @r4+,x0
        psha    x0,y0,a0        movx.w  a1,@r5+
                                movx.w  a0,@r5+ rts
        nop
```

What is claimed is:

1. A method for use in a fixed point arithmetic processing device having an input vector that contains one or more vector elements, and is an M bit integer, and a maximum permitted left shift (MLS) value for the input vector is less than or equal to the value of M−2, the method for scaling all the vector elements based on the vector element with the largest magnitude, the method comprising:

sequentially searching each vector element to find a left shift value for scaling each vector element;

comparing the left shift values to determine a minimum left shift (NLS_MIN) for scaling the largest vector element;

employing the NLS_MIN value to determine whether the input vector is a non-zero input vector;

if so, regardless of whether the largest element of non-zero input vector has a positive or negative magnitude, offsetting the NLS_MIN value by the MLS value to obtain an actual number of left shifts (NLS) value for scaling the input vector;

determining whether the input vector is a zero input vector; and if so, offsetting the NLS_MIN value by the MLS value to obtain the NLS value.

2. The method of claim 1 further comprising employing a pdmsb instruction for sequentially searching, and for comparing said left shift values.

3. A method, by a processing device, for scaling an M-bit integer input vector containing one or more vector elements, said method comprising:

receiving a maximum permitted left shift (MLS) value for the input vector, said MLS value being less than or equal to M−2;

determining a minimum left shift (NLS_MIN) for scaling said vector element with the largest magnitude;

employing said NLS_MIN value to determine whether said input vector is a zero input vector, or a non-zero input vector irrespective of the positive or negative value of said non-zero input vector;

if a non-zero input vector is determined, offsetting said NLS_MIN value by said MLS value to obtain an actual number of left shifts (NLS) value for scaling said input vector; and if a zero input vector is determined, offsetting said NLS_MIN value by said MLS value to obtain the NLS value.

4. The method of claim 3 wherein offsetting said NLS_MIN value for said zero input vector further comprises said NLS value being given by: MLS+1.

5. The method of claim 3 wherein offsetting said NLS_MIN value for said non-zero input vector further comprises said NLS value given by: NLS=NLS_MIN+(MLS−(M−2)).

6. The method of claim 3 further comprising employing a pdmsb instruction for sequentially searching, and for comparing said left shift values.

7. The method of claim 3 wherein employing said NLS_MIN value further comprises determining whether NLS_MIN=31, if NLS_MIN≠31, then the input vector is a non-zero input vector.

8. A processor operable from an M-bit instruction set where M is an integer, the processor comprising:

a memory unit for storing at least first instruction stream comprising M-bit instructions;

an execution unit operable to receive execution signals to execute the M-bit instructions;

a decode unit coupled to the memory unit and to the execution unit to receive and decode the first instruction stream from the memory unit to produce therefrom the execution signals, the execution signals for:

determining a minimum left shift (NLS_MIN) for scaling said vector element with the largest magnitude;

employing said NLS_MIN value to determine whether said input vector is a zero input vector, or a non-zero input vector by evaluating if NLS_MIN=31;

if NLS_MIN≠31, then the input vector is a non-zero input vector; and determining an actual number of left shifts (NLS) for scaling the non-zero input vector.

9. The method of claim 8 wherein the execution signals is for receiving a maximum permitted shift (MLS) value for said input vector, said MLS value being less than or equal to M−2.

10. The method of claim 9 wherein determining an actual number of left shifts (NLS) further comprises offsetting said NLS_MIN with the MLS value to obtain said NLS value.

* * * * *